United States Patent [19]

Doughty

[11] Patent Number: 4,513,459
[45] Date of Patent: Apr. 30, 1985

[54] BLEACH CAKE IN AN IMPROVED BLEACH RESISTANT PARTICLE RETAINING MEANS

[75] Inventor: Elexsis D. Doughty, Fairfield, Ohio

[73] Assignee: The Procter & Gamble Company, Cincinnati, Ohio

[21] Appl. No.: 591,370

[22] Filed: Mar. 20, 1984

[51] Int. Cl.³ ............................................. E03D 9/02
[52] U.S. Cl. ............................................ 4/222; 4/228;
8/101; 8/108 A; 8/DIG. 4; 8/DIG. 10;
206/0.5; 206/819; 222/416; 222/424.5;
222/541; 252/90; 252/92; 252/99; 252/176;
422/37; 422/266; 428/288; 428/290
[58] Field of Search ............... 4/227, 228, 222; 8/101,
8/108 A, DIG. 4, DIG. 10; 206/819, 0.5;
222/416, 424.5, 541; 252/90, 92, 94, 99, 176;
428/288, 290; 422/37, 266

[56] References Cited

U.S. PATENT DOCUMENTS

| | | | |
|---|---|---|---|
| 2,086,937 | 7/1937 | Harborne | 422/266 |
| 3,154,495 | 10/1980 | Robson et al. | 252/99 |
| 4,010,306 | 3/1977 | Fagan | 428/236 |
| 4,208,747 | 6/1980 | Dirksing | 4/228 |
| 4,281,421 | 8/1981 | Nyquist et al. | 4/228 |
| 4,305,162 | 12/1981 | Cornelisse, Jr. et al. | 4/228 |
| 4,307,474 | 12/1981 | Choy | 4/228 |

*Primary Examiner*—Paul Lieberman
*Assistant Examiner*—Robert A. Wax
*Attorney, Agent, or Firm*—Richard C. Witte; Ronald L. Hemingway; Leonard Williamson

[57] ABSTRACT

An article of manufacture comprising a calcium hypochlorite cake composition in an improved particle retaining means which comprises a water-permeable polyvinyl chloride (PVC) bonded polyester (PET) filter sleeve which envelopes and supports the cake. The filter sleeve is designed to be rigid to avoid collapse in use, wicks water for improved cake contact, and is bleach resistant to insure a long product life.

11 Claims, 1 Drawing Figure

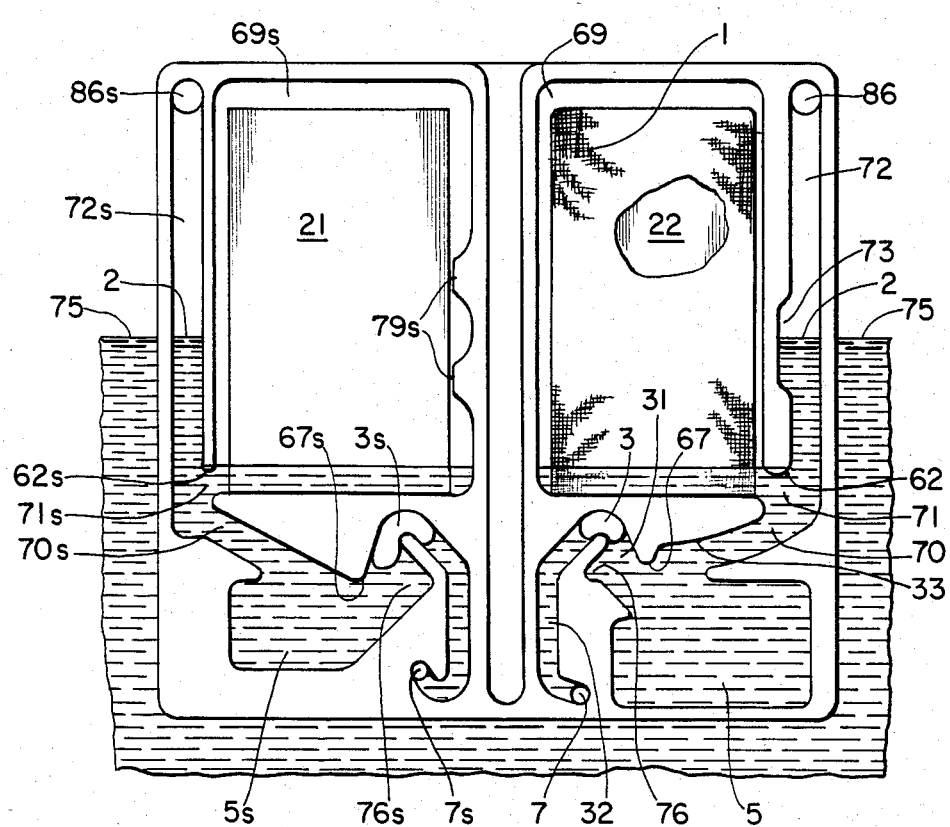

BLEACH CAKE IN AN IMPROVED BLEACH RESISTANT PARTICLE RETAINING MEANS

TECHNICAL FIELD

This invention relates to disinfecting devices adapted to dispense disinfectant solutions to the tank of a conventional toilet when it is flushed.

BACKGROUND ART

The following references will serve as background art for the present invention:

U.S. Pat. No. 3,154,495, Robson et al., issued Oct. 22, 1964, discloses articles comprising enveloped granular and very small tableted hypochlorite materials. British Pat. No. 3,349, Lees, issued Feb. 20, 1892, discloses a disinfecting apparatus using a wire gauze filter means to contain solids.

A partially dissolving cake is disclosed in commonly owned U.S. Pat. No. 4,281,421, Nyquist, Kitko and Stradling, issued Aug. 4, 1981. The partially insoluble cake comprising hypochlorite and metasilicate salts forms an insoluble shell upon use. In one execution, just the lower part of the cake is immersed in liquid and "leaching" dissolves the active located in the upper part of the cake. Thus, one drawback to these cakes is that of the hypochlorite active in the uppermost part of the cake is wasted.

U.S. Pat. No. 4,208,747, Dirksing, issued June 24, 1980, discloses highly effective dispensers which are placed in a toilet tank and which receive a dose volume of water from the toilet tank and dispense a dose volume of a solution of cleaning or disinfecting composition every time the toilet is flushed. This patent teaches that cake compositions can be used as the source of cleaning and disinfecting agents in such dispensers, but fails to address specific problems posed by certain types of cakes. One problem is that a cake of calcium hypochlorite material immersed completely in the dosing liquid tends to initially deliver excessively high levels of chlorine. Thus, the chlorine is used up too fast. FIGS. 9–14 and 18 of U.S. Pat. No. 4,208,747, Dirksing, disclose "top-feed" dispensers in which such cakes are completely immersed in the dosing liquid. There, the solution is drawn from above the cake. Such cake/dispenser combinations do not deliver a consistent amount of available chlorine over the life of the cake. In contrast, the Dirksing '747 patent also discloses a dosing dispenser of the "bottom-feed" type illustrated in FIGS. 1–8 and 15–17. Symmetrical rectangular-shaped cakes are used therein. In such dispensers the bleach cake is only partially immersed in dosing liquid in the reservoir. The solution is drawn from an area near the bottom of the cake. This latter concept is important to the present invention.

U.S. Pat. No. 4,307,474, Choy, issued Dec. 29, 1981, discloses a passive dosing dispenser exhibiting improved resistance to gel clogging. An anti-clogging means comprising support means in the lowermost portion of the product chamber (cake compartment) and a level control means to control the level of liquid in the product chamber are also disclosed. The support means help to prevent gelled and solid chips from obstructing the flow of liquid in and out of the chamber.

Some major problems in this art have been with dissolving bleach cakes. One is dispensing even concentrations of the bleach. One cause of this is that particles from said cakes pass into the reservoir of the dispenser and thereby reduce the effective volume of liquid which is needed for rapid equilibrium and formation of the dosage of bleach which is to be dispensed in the next flush of the toilet. Further, the particles which break off the cake and pass through to the toilet water result in a loss of efficient bleach use, and some of the particles may clog the passageways through which liquid flows from the dispenser. Another problem has been that most of the effective volume of bleach liquid in the reservoir was dispensed with each dose.

It has recently been discovered that a filter sleeve can be employed in a "bottom feed" dispenser to retain the cake and chipped particles.

New problems in this art are related to the filter means material itself. The prior art preferred filter sleeves for solid cakes of hypochlorite are made from polyethylene and essentially pure polyester laid nonwoven fabrics. Delnet ® nonwoven polyethylene P-5-30 and Novonette ® Stock 149-305 polyester are some of the best prior art fabrics used as filter sleeve material. Experience with these materials employed in dosing dispensers revealed several things. First, dry storage problems were experienced after about six months. Second, polyester and polyethylene filter sleeves wick poorly. Thus, they have poor wetability, which impedes water contact with the cake and even hypochlorite delivery. Third, the Delnet and Novonette materials occasionally collapse, bunch or buckle when used in the dosing dispensers after some time. This may also impede even hypochlorite delivery. Fourth, these materials degrade in concentrated hypochlorite solutions.

BRIEF DESCRIPTION OF THE DRAWING

Shown is a schematic view of twin passive dosing dispensers with isolated surfactant cake 21 and isolated bleach cake 22. The bleach cake 22 is enveloped in a filter sleeve particle retaining means 1.

SUMMARY OF THE INVENTION

An article of manufacture comprising a calcium hypochlorite cake composition in an improved particle retaining means which comprises a hydrophilic, water-permeable polyvinyl chloride bonded polyester filter sleeve which envelopes and supports the cake. The article is employed in a passive dosing dispenser wherein the cake is upright and only a lower portion of the cake is immersed in an aqueous liquid. The filter sleeve is more resistant to bleach attack and is more rigid to avoid collapse when used. The improved filter sleeve is also designed to wick water for better cake dissolution.

DETAILED DESCRIPTION OF THE INVENTION

The essence of the invention is an article of manufacture comprising a soluble, solid bleach cake contained in a rigid, bleach-resistant filter sleeve made of a water-permeable fabric.

The Filter Sleeve

The filter sleeve envelopes the cake, as shown in the drawing as 1. It will retain particles of about 150 microns and above. Woven substrates can be used in the practice of this invention and as used herein in the broad sense nonwoven indicates woven substrates.

The filter sleeve is a vinyl chloride copolymeric bonded polyester nonwoven substrate which has a porosity of from 200 to about 800 cfm/sq.ft.; and preferably from 200 to 650 cfm/sq.ft. The more preferred filter sleeve has a porosity of about 400 to 600 and is made from a substrate comprising about 50/50 PET and PVC. The substrate has a basis weight of about 30 g/m$^2$ to 55 g/m$^2$. The substrate is made by passing a nonwoven polyester material through a vinyl chloride copolymeric latex (PVC) bath. A suitable preparation procedure is described hereinafter.

PVC Binder

The PVC is a vinyl chloride polymeric latex binder material having a molecular weight of from about 157,000 to about 215,000. Preferred PVC binder material is a 45/55 to 55/45 Geon 352/Geon580×158 blend. Geon 352 is a vinyl chloride acrylic latex emulsion having a MW of about 170,000. The MW of this type of PVC latex can range from about 157,000 to 183,000. Geon 580×158 is a vinyl chloride ethyl acrylate copolymer having a MW of about 200,000. The MW of this PVC can vary from about 185,000 to about 215,000. Other suitable PVC latexes can be used in making the bonded polyester substrates of the invention subject to the other requirements. The preferred binder has about 50/50 mix of Geon 352 and Geon 580×158. They are manufactured by B. F. Goodrich Chemical Co., Cleveland, Ohio.

The following tests will disclose how the filter sleeve material of this invention is characterized.

I. Dry Wicking Rate Test

Principle

Determine the time in seconds required for a sample to absorb 0.10 ml of distilled water using a timer.

Apparatus

1. Reid Tester
2. Timer
3. Cutter

Apparatus Description

The Reid Tester consists of a glass reservoir approximately 500–600 ml in volume. A 3-way valve is connected to the reservoir by tygon tubing. The distilled water in the instrument reservoir is allowed to flow from both the orifice or the open tip of the pipette, depending on the position of the 3-way valve. The leveling feet are connected to the base so that the Plexiglas plate of the tester is exactly level.

Sample

Cut 3" (7.6 cm) wide sample strips across the roll (8" (20.3 cm) roll). Run four tests per sample strip, three strips per sample.

Apparatus Preparation

1. New or very infrequently used testers should be washed out with 0.5N hydrochloric acid. Allow this acid to remain in the tester for several hours, drain and refill with fresh acid for an additional 1–3 hours. Flush tester thoroughly with distilled water at least five times until pH is the same as the distilled water and no chloride ion remains.
2. Pressure flush this apparatus with distilled water each day before operation.
3. Carefully adjust the leveling feet so that the Plexiglas plate of the tester is exactly level.

Procedure

1. Make sure no air is entrained anywhere in the tubing/pipette assembly, and that the pipette tip is filled and any drops absorbed from the Plexiglas plate.
2. Turn 3-way stopcock to fill the calibrated pipette. Absorb the drops from the open end and shut off stopcock so that the pipette is exactly at 0.10 ml.
3. Place one end of the sample strip over the lower plate and cover with top plate.
4. Turn the stopcock so the red dot is straight up.
5. Immediately start the timer if the water begins to wick from the calibrated pipette; if not, tap the top of the Plexiglas plate until the wicking begins and immediately start the timer.
6. As soon as the water crosses the zero (0) line, stop the timer and shut the stopcock. Record to one-tenth second.
7. Move the sample approximately 1.5 inches further down the strip. Repeat from Step 2. Report as average number seconds for twelve readings.

Rigidity Tests

Cantilever Bending Test

II. Dry Rigidity Test

Scope

A stiffness measurement is obtained by extending a strip of fabric beyond a stationary table edge onto a bend angle indicator. The test can evaluate any semi-rigid material such as plastic film, foil, paper products, textiles and nonwovens.

Apparatus

TMI Cantilever Bend Tester Model 79-10

Sample

Cut 5 strips 1"×8"(8"(20.3 cm) in machine direction).
Cut 5 strips 1"×8"(8"(20.3 cm) in cross direction).
Condition a minimum of four hours at 50° RH, 73° F. (22.8° C.).

Procedure

1. Remove the movable slide from the stationary table.
2. Place the sample to be tested on the stationary table so that its long dimension is parallel to the edge of the table and the leading edge is in line with the scribed line located ¼" from the right-hand edge of the table.
3. Place the movable slide over the gear rack pins, not touching the sample and manually move the movable slide and gear rack to the left until the left end of the slide hits the stop on the back plate.
4. Lower the slide onto the sample being careful not to move it.
5. Using the two knurled screws provided, adjust the bend angle indicator to 41.5° and lock.
6. Turn the on-off switch to ON.
7. When the leading edge of the sample touches the knife edge of the bend angle indicator, turn the on-off switch to OFF.
8. read the overhang length from the scale on the upper slide, record in mm.
9. There will be one reading per strip.

Report

The bending length by averaging overhang length/2.

III. Wet Rigidity Test

Same as dry, except substrate is first saturated with distilled water.

Procedure for Making the S&F PVC/PET Filter Sleeve Substrate*

1. Polyester (PET) nonwoven is made like other nonwovens having basis weight of about 23.4 g/yd².
2. Nonwoven material then goes through a polyvinyl chloride (PVC) latex bath containing: water, ammonium salts, PVC latex binders, a cross-linking agent, and a dispensing aid, at ambient temperature (about 25° C.). The wet fabric is then dried on drum dryers at a drum temperature of 163° C. The fabric actually absorbs the PVC. Other wetting agents can be suspended in the PVC bath. A preferred substrate made by the above procedure has the following formulation.

The substrate of this invention is manufactured on a card/bond line. Three zones of operation are employed:
1. Fiber Preparation. This is accomplished on a multiple card system. In these trials three card webs were plied to produce a heavier, unsaturated, i.e., unbonded, web.

*Custom made for Procter & Gamble by The Stearns & Foster Co., Cincinnati, Ohio 45215, U.S.A.

2. The unbonded web was passed through a saturator containing a binder pool.
3. The wet, saturated web was passed over a series of dry cans. Excess water was evaporated, and the binder was cured.

Fiber Preparation:

The material used was 1.5 denier Celanese Type 417 polyester. Other polyester fibers and other deniers are also usable.

Saturation:

The saturation is accomplished by passing the unbonded web through a pool of diluted binder solution and subsequently squeezing the excess binder from the web by passing between two rolls which are under pressure. The binder, or saturant, used to bond the polyester is described in Table A.

TABLE A

| Component | Parts |
| --- | --- |
| Water | 686.0 |
| Ammonium Chloride | 2.0 |
| Ammonium Hydroxide | 4.0 |
| Geon 580 × 158 | 200.0 |
| Geon 352 | 200.0 |
| Cymel 303 } Premix | 7.0 |
| Triton X-100 | |
| (% Solids 21.15%) | 1100.00 |

Note that Triton X-100, which is an octylphenoxy (polyethoxy ethanol) surfactant HLB 13.5, is needed to disperse the Cymel 303, which is not easily dispersible in water. The Triton X-100 would be needed, even in a so-called "surfactant-free", "non-wetting agent" system.

The binder is applied always at ambient temperature, which is about 24°–25° C.

Drying:

The saturated, wet web is passed over dry cans at 163° C. The estimated web temperature does not exceed 116° C.

The final construction of the material is a product weighing about 43 grams per square meter, nominal weight. Usually this would vary in practice by ±10%, or a range of 39 to 48 g per square meter.

The binder content of the web is 50%, which would indicate a web constructed as follows:

Polyester: 21–22 g/m²
Dry binder: 21–22 g/m²

The substrate was about 102 cm, trimmed. The line may be extendable to 137–142 cm, but should be determined by trial.

Cymel 303 is a cross-linking agent which is hexamethoxymethylmelamine (98% solids), American Cyanamid Co., Polymer & Chemical Dept.

Geon 352 is a PVC copolymer, MW=170,000±7.5%, consisting of PVC and latex emulsion, provides functionality and wet strength. B. F. Goodrich Chemical Co., Cleveland, Ohio 44131, U.S.A., Safety Data Sheet Doc. 83002, Jan. 1983 and Technical Data Geon 352 2082h/08120 incorporated herein by reference.

Geon 580×158—MW=200,000±7.5%, does not include the plasticizer, but not important since the plasticizer is not part of the backbone anyway. PVC copolymer consisting of PVC and ethyl acrylate, a small amount of plasticizer is added to the copolymer, provides wet strength and flexibility. Note: PVC without additives would be so brittle that it could not be processed. B. F. Goodrich Chemical Co., Cleveland, Ohio 44131, U.S.A. Safety Data Sheet 83013, January, 1983 and Technical Data Geon 580×158 document 0813310j-10 incorporated herein by reference.

An approximated final substrate composition is set out in Table B.

TABLE B

| | |
| --- | --- |
| Polyester fiber nonwoven | 48–50% |
| Geon 352 - PVC copolymer, provides functionality | 23–25% |
| Geon 580 × 158 - PVC copolymer, contains plasticizer | 23–25% |
| Cymel 303 - provides wet strength and durability | 1.5% |
| Triton X-100 - nonionic, wetting agent | 1.0% |

Another preferred substrate formulation is the same as above, except that 1 part of Aerosol OT-75, an anionic dioctyl ester of sodium sulfosuccinic acid made by American Cyanamid, is added to the bath and is present at a level of less than 1% in the finished substrate.

The Dosing Dispenser

Again, the article of the invention is used as part of a dosing dispenser. The dosing dispenser is placed into the water tank of a toilet. The dispenser has means for passively receiving a dose volume of water from the tank. U.S. Pat. No. 4,208,747, Dirksing, issued June 24, 1980; U.S. Pat. No. 4,305,162, Cornelisse, Jr., et al., issued Dec. 15, 1981; and U.S. Pat. Application Ser. No. 452,543, Dirksing et al., for "Article and Method for Maintaining More Even Concentrations of Bleach in a Passive Dosing Dispenser," filed Dec. 23, 1982; are all incorporated herein by reference for their teachings on passive dosing dispensers, their preparation and operation.

DETAILED DESCRIPTION OF THE DRAWING

It will be noted that dual dispensers are shown in the drawings. The surfactant cake 21 is isolated from the bleach cake 22. The dual dispensers are similar. Corresponding element numbers for the surfactant side are designated "S". Both dispensers have: vent holes 86, vent tubes 72, cake compartments 69, outlets 71, baffles 67, passageways 70, bubble lock 3, air trap 76, reservoirs 5, and exit ports 7. The bleach cake vent tube 72 has a bulb 73.

The surfactant side has protrusion 79S to steady the cake. The baffle means must be designed to limit the size of the air lock bubble. The bubble 3 must be small enough to allow the dose volume of liquid above the baffle 67 to be discharged.

Note that inlet/outlet exit port 7 leads to first inlet/outlet passage way 32, which is in fluid communication with the bubble lock 3, which is in fluid communication with second inlet/outlet passageway 31 on the internal reservoir 5 side. Incline 33 of passageway 70 is sufficiently steep to shear excess air and vent same during refill. Passageway 70 leads to cake compartment 69 and vent tube 72.

The dispenser and its operation are disclosed in commonly owned U.S. Pat. No. 4,305,162, to Cornelisse, Jr., et al., issued Dec. 15, 1981, for "Passive Dosing Dispenser Enveloping Captive Air Bubble to Provide Product Isolation."

The reservoir section 5 below baffle 67 for the bleach cake preferably holds about 8 mls. It can hold from about 6 ml to about 12 ml. The amount of liquid in the dispenser above baffle 67 is about 1 ml to about 4 ml. This is equal to the dose volume for the bleach dispensed. The bubble lock 3 is smaller than 3S and baffle 67 is higher than 67S to thereby facilitate firing of a smaller doses while maintaining a 3:1 to 6:1 volumetric ratio of reservoir to dose volume.

The received water is routed to compartment 69 within the dispenser which contains the active. The dispenser has a lowermost edge 62 means for immersing only a lowermost portion of the cake to a predetermined depth in the received water to facilitate dissolving a portion of the cake for dispensing at a later time. The bleach cake in compartment 69 is enveloped in a filter sleeve means 1 which contains the cake 22 and retains cake particles which become detached from the cake during use. The filter sleeve 1 is an envelope of laid fibers.

The liquid in the compartment 69 is released each time the dispenser is fired, responsive to the flushing of the toilet. The quantity of fluid subject to discharge during the flush cycle is preferably 2 ml and the volume of solution in the dispenser including reservoir 5 is preferably from 7 to 16 ml, with 6 to 12 ml of this being in reservoir 5.

When the toilet is flushed, the external water level 75 in the toilet tank drops, causing water level 2 to drop. The air bubble 3 moves out exit port 7. The volume of liquid above baffle 67 is released from the dispenser. As soon as the liquid level falls from level 2 to the baffle 67, the discharge action is terminated. None of the liquid volume below baffle 67 will be discharged. The same applies for the surfactant side.

The reservoir section 5 holds from about 6 ml up to about 12 ml; this volume of liquid insures that the concentration of bleach to be fired on the next flush will be potent in a rapid flush situation.

For the surfactant side, the reservoir section 5S preferably holds about 10 to about 12 ml. The dose volume for the surfactant solution is preferably about 5 ml, which is larger than the bleach dose.

The dimensions of a preferred bleach cake compartment 69 are about 9.1 cm $\times$ 5.0 cm $\times$ 2.2 cm. The dimensions of a preferred bleach cake 21 are 8.4 cm $\times$ 4.1 cm $\times$ 1.9 cm. The cake is sized to initially occupy most of the cake compartment space within the dispenser reservoir. The cake and the cake compartment preferably have cake surfaces and vertical compartment walls which are parallel to each other. It is important that there is at least 0.4 cm to 4 cm of free space between the vertical cake surfaces and the cake compartment walls. Some preferred free spaces are from 0.4 cm to 4 cm, 0.5 cm to 1.5 cm, and 0.5 cm to 2 cm.

The dispenser retains the hypochlorite solution in substantial isolation from the body of toilet tank water during quiescent periods in between flushes. Upon flushing of the toilet, an available chlorine level of from about 2 parts per million (ppm) to about 10 ppm is established in the toilet bowl water. The hypochlorite solution formed in the dispenser reservoir generally contains from about 0.5% to about 15% available chlorine. The average concentration of available chlorine there is typically from 9% to 15% and preferably 10% to 11%.

The solid cake is formulated to slowly dissolve and "gravity feed" into the water in the cake compartment 69 of the dispenser and disappear after the toilet has been flushed a sufficient number of times to exhaust all of the hypochlorite in the cake. It is important, for a more uniform delivery of bleach, that the dispenser has a means to maintain in the reservoir section 9 a volume of aqueous liquid of about 6 ml to about 12 ml. The dispensed dose volume should be about $\frac{1}{8}$ to about 1/6 of the reservoir volume. Again, the idea is to deliver about 1 ml to about 4 ml, preferably about 1.5 to 3 ml of concentrated hypochlorite solution. This is accomplished by adjusting the elements of the dispenser shown in the drawings. It is important to design the elements of the dispenser so that the complete intended doses will discharge.

The Bleach Cake

The calcium hypochlorite cake of this invention is preferably a tableted solid composition comprising: (I) from about 10% to about 98% of a substantially stable calcium hypochlorite; (II) an effective amount of a water-soluble calcium hypochlorite cake swelling control salt selected from the group consisting of lithium hypochlorite material (Form 2 ®), lithium hydroxide, lithium sulfate, lithium chloride and other water-soluble lithium salts, and mixtures thereof; and (III) the balance being a mixture of salts and other by-product materials normal to the manufacture of calcium hypochlorite. See the examples for preferred compositions.

Bleach Cake Preparation

The compacted solid calcium hypochlorite cake compositions of this invention may be prepared by conventional compacting procedure. For example, granules of calcium hypochlorite, e.g., HTH ®, and granules of the selected swelling control salts are mixed together, and this mixture is then pressed into a cake with a compacting machine. The granules are generally in a size range of from about 50 microns to about 1,000 microns prior to compacting. The compacted solids can also be formed by tabletting, "slugging," Chilsonating, or otherwise converting the granular hypochlorite mixture into compacted forms. Compacting may be accomplished at pressures of from about 0.5 tons/square inch to about 200 tons/square inch, preferably from about 1.0 ton/square inch to about 50 tons/square inch to about 5.0 tons/square inch. The compacting can be done on any conventional compacting apparatus, e.g., a Stokes Model R4 Tablet Press. The compacted cakes generally have a specific gravity of about 1.3 to about 2.3, preferably from about 1.5 to about 2.0. The cakes weigh from 45 g to 120 g. A preferred cake is disclosed in commonly owned U.S. Patent application Ser. No. 355,984, J. M. Mueller and L. E. Small, filed Mar. 8, 1982, incorporated herein by reference in its entirety.

The cake is formed into shapes with dimensions appropriate to fit the cake compartment of the gravity feed dosing dispenser which holds the cake.

EXAMPLES 1-5

| | Substrate Dry Wicking Properties | |
|---|---|---|
| Example | Material | Time |
| Ex. 1 | S & F w/wetting agent | 25.5 sec. |
| Ex. 2 | S & F w/o wetting agent | 20.4 sec. |
| Ex. 3 | Sontara 8000 (PET) | no wicking |
| Ex. 4 | Novonette (PET) | no wicking |
| Ex. 5 | Delnet (PE) | no wicking |

S&F is the above-described PVC/PET substrate custom made for The Proctor & Gamble Company by The Stearns & Foster Co., Cincinnati, Ohio 45215, U.S.A. S&F with wetting agent contains less than 1% Aerosol OT-75.

Sontara 8000 is a 100% polyester nonwoven having a basis weight of 41 g/m$^2$; E.I. duPont de Nemours & Co., Wilmington, Delaware 19898, U.S.A.

Novonette 305 is a 100% polyester nonwoven having a basis weight of 32.8 g/m$^2$; The Kendall Co., Boston, Massachusetts 02101, U.S.A.

Delnet P-5-30 is a polyethylene nonwoven having a basis weight of 16.8 g/m$^2$, Hercules, Inc., Wilmington, Delaware

EXAMPLES 6-10

| | Rigidity | |
|---|---|---|
| | Wet Bending Length - Machine Direction | |
| Example | Material | Bending Length |
| Ex. 6 | S & F w/o wetting agent | 4.8 mm |
| Ex. 7 | S & F w/wetting | 4.8 mm |
| Ex. 8 | Novonette (PET) | 2.6 mm |
| Ex. 9 | Sontara (PET) | 1.8 mm |
| Ex. 10 | Delnet (PE) | 1.4 mm |

EXAMPLES 11-15

| | Rigidity | |
|---|---|---|
| | Dry Bending Length - Machine Direction | |
| Example | Material | Bending Length |
| Ex. 11 | S & F w/o wetting agent | 7.8 mm |
| Ex. 12 | S & F w/wetting | 8.0 mm |
| Ex. 13 | Novonette (PET) | 2.3 mm |
| Ex. 14 | Sontara (PET) | 2.7 mm |
| Ex. 15 | Delnet (PE) | 1.4 mm |

This substrate has wet bending values of at least 3 mm and dry bending values of at least 4 mm.

EXAMPLE 16

Preferred 5-week bleach cakes (Cakes B and C in Table 1) with a particle retaining filter sleeve completely enveloping the cake have the following make up:

| FORMULATIONS "B" AND "C" | |
|---|---|
| HTH [Ca(OCl)$_2$] | 95% |
| Li$_2$SO$_4$ | 5% |
| Dimensions & Physical Properties | |
| Length | 2.75" = 7.0 cm |
| Width | 1" = 2.5 cm |
| Thickness | 0.17" = 1.8 cm |
| Weight | 55 g |
| Density | 1.75 g/cc |
| AvCl | 35 g |
| Filter Sleeve Material for the Nonwoven PET/PVC | |
| Length | 3.75" = 9.52 cm |
| Width | 1.75" = 4.45 cm |
| Thickness | 0.010" = 0.03 cm |
| Porosity | 227 cfm/ft$^2$ = 69.2 m$^3$ per min/m$^2$ |
| Weight | 37 g/sq. yd. = 43.3 g/m$^2$ |
| Dry Wicking Rate | 25.5 sec. |
| Dry Rigidity | 8 |
| Wet Rigidity | 4.8 |

A preferred 5-week bleach cake (Cake D in Table 1) with a particle retaining filter sleeve completely enveloping the cake has the following make up:

| FORMULATION "D" | |
|---|---|
| HTH [Ca(OCl)$_2$] | 90% |
| Form 2 (LiOCl) | 10% |
| Dimensions & Physical Properties | |
| Length | 2.21" = 5.6 cm |
| Width | 1.22" = 3.1 cm |
| Thickness | 0.76" = 1.93 cm |
| Weight | 55 g |
| Density | 1.76 g/cc |
| AvCl | 35 g |
| Filter Sleeve Material for the Nonwoven PET/PVC | |
| Length | 3.5" = 8.89 cm |
| Width | 2.5" = 6.35 cm |
| Thickness | 0.010" = 0.03 cm |
| Porosity | 227 cfm/ft$^2$ = 69.2 m$^3$ per min/m$^2$ |
| Weight | 37 g/sq. yd. = 43.3 g/m$^2$ |
| Dry Wicking Rate | 25.5 sec. |
| Dry Rigidity | 8 |
| Wet Rigidity | 4.8 |

The two preferred bleach cake formulations B/C and D set out in Example 16 are believed to be functional equivalents. They have equal amounts of available chlorine and have approximately equal densities and solubility properties. The dosing dispensers used were designed to accommodate the two sizes of the cakes.

One hundred each of bleach cakes labeled A, B, C and D of Table 1 were tested in toilets under normal use. Reported are: (1) the average available chlorine (AvCl) dose delivered for each successive week; and (2) the percentage of doses having AvCl of less than 3 ppm. Three parts per million is critical for continued bowl cleaning. In the cases of B and C, the sleeve material must have bunched to cause the larger percentages of failures less than 3 ppm, i.e., average doses with AvCl.

TABLE 1

|  | Delivery Data | | | |
|---|---|---|---|---|
|  | Wk 1 | Wk 2 | Wk 3 | Wk 4 |
| Cake A | | | | |
| AvCl | 8.6 | 7.6 | 5.8 | 4.9 |
| % < 3 ppm | 5 | 9 | 17 | 31 |
| Cake B | | | | |
| AvCl | 5.7 | 4.6 | 3.9 | 3.7 |
| % < 3 ppm | 12 | 27 | 41 | 44 |
| Cake C | | | | |
| AvCl | 5.8 | 5.2 | 4.6 | 4.6 |
| % < 3 ppm | 18 | 19 | 26 | 30 |
| Cake D | | | | |
| AvCl | 7.9 | 6.8 | 4.8 | 4.3 |
| % < 3 ppm | 5 | 5 | 19 | 26 |

"A" was HTH and metasilicate control, no filter sleeve.
"B" was Delnet-polyethylene filter sleeve and HTH/$Li_2SO_4$ (95/5).
"C" was Sontara-polyester filter sleeve and HTH/$Li_2SO_4$ (95/5).
"D" was S & F filter sleeve and HTH/LiOCl (90/10).

All cakes, A-D, were 5-week cakes. Cakes B, C and D all had 35 grams of AvCl, approximately equal densities, and were housed in dosing dispensers designed to deliver equal doses of AvCl.

---

Bleach Delivery

Assumptions:
1. Delivery profiles are equal.
2. Longevities are equal at approx. 35 days.
3. 10 flushes per day.

Formulation B and C Cakes (5-week)

Grams chlorine/cake = 34.99

$$\frac{34.99}{350} = 0.09997 \text{ g/flush}$$

Concentration of delivered solution =

$$\frac{0.09997 \text{ g}}{5.5 \text{ ml/dose}} = 0.0182 \text{ g/ml}$$

Formulation D Cakes (5-week)

Grams chlorine/cake = 35.71

$$\frac{35.71}{350} = 0.102 \text{ g/flush}$$

Concentration of delivered solution =

$$\frac{0.102 \text{ g}}{5.8 \text{ ml/dose}} = 0.0176 \text{ g/ml}$$

Within the experimental error, the grams of available chlorine delivered per flush for these two cakes, B/C and D, are essentially the same.

What is claimed is:

1. An article of manufacture comprising a solid cake of water-soluble calcium hypochlorite: CHARACTERIZED IN THAT:
   a nonwoven water-permeable envelope contains said solid cake, said envelope made of a heat sealable substrate comprising a polyester fiber bonded with a polyvinyl chloride polymeric latex binder (PVC), said substrate having a basis weight of from 30 to 55 g/$m^2$, and a weight ratio of said PVC/Polyester of about 20:80 to about 60:40; said substrate having a minimum wet bending value of 3 mm.

2. The invention of claim 1 wherein said substrate has a positive dry wicking rate.

3. The invention of claim 1 wherein said PVC has a molecular weight of from 157,000 to 215,000 and said substrate has a basis weight of from 35 to 50 and said PVC/Polyester has a ratio of 45:55 to 55:5; said substrate having a wet bending value of at least 4 mm and a wicking rate of 100 sec.

4. The invention of claim 1 wherein said substrate has a porosity from 200 to 800 cfm/sq.ft. (about 61 to about 244 $m^3$ per min/$m^2$).

5. The invention of claim 3 wherein said porosity is from 200 to 650 cfm/sq.ft. (about 61 to about 198 $m^3$ per min/$m^2$).

6. The invention of claim 3 wherein said porosity is from 400 to 600 cfm/sq.ft. (about 122 to about 183 $m^3$ per min/$m^2$).

7. The invention of claim 1 wherein said PVC consists of (a) vinyl chloride acrylic latex having a MW of from about 157,000 to 183,000 and (b) vinyl chloride ethyl acrylate latex having a MW of from about 185,000 to about 215,000.

8. The invention of claim 7 wherein said (a) and (b) have a weight ratio of 45/55 to 55/45.

9. The invention of claim 1 wherein said substrate contains less than 1% of a crosslinking agent.

10. The invention of claim 9 wherein said crosslinking agent is hexamethoxymethylmelamine.

11. The invention of claim 10 wherein said substrate has a dry bending value of at least 4 mm.

* * * * *

UNITED STATES PATENT AND TRADEMARK OFFICE
CERTIFICATE OF CORRECTION

PATENT NO. : 4,513,459
DATED : April 30, 1985
INVENTOR(S) : Elexsis D. Doughty

It is certified that error appears in the above-identified patent and that said Letters Patent is hereby corrected as shown below:

Col. 5, line 57, in TABLE A, after "Triton X-100" insert in the "Parts" column --- 1.0 ---.

Col. 9, line 30, "Proctor" should read --- Procter ---.

Signed and Sealed this

Eighth Day of October 1985

[SEAL]

Attest:

DONALD J. QUIGG

Attesting Officer

Commissioner of Patents and Trademarks—Designate